United States Patent
Court et al.

[19]

[11] Patent Number: 6,125,540
[45] Date of Patent: Oct. 3, 2000

[54] CONTINUOUS PROCESS FOR FORMING STRUCTURE SUITABLE FOR USE AS A CORE MEMBER

[75] Inventors: Calvin L. Court, Texarkana, Tex.;
Tawne L. Castorina, Texarkana, Ark.;
Calvin L. Court, Wake Village; Melvin T. Court, Texarkana, both of Tex.

[73] Assignee: Newcourt, Inc., Texarkana, Tex.

[21] Appl. No.: 09/024,174

[22] Filed: Feb. 17, 1998

[51] Int. Cl.[7] .................................................. B21D 47/00
[52] U.S. Cl. .......................... 29/897; 29/897.32; 29/430; 29/564; 29/33 T; 29/417; 156/158; 156/296
[58] Field of Search .............................. 29/897, 897.32, 29/430, 558, 564, 33 B, 33 T, 791, 796, 417, 419.1; 156/296, 157, 251, 158, 159

[56] References Cited

U.S. PATENT DOCUMENTS

| | | |
|---|---|---|
| 1,708,462 | 4/1929 | Bodman . |
| 2,055,877 | 9/1936 | Palmer ..................... 156/205 |
| 2,369,006 | 2/1945 | Banks . |
| 2,477,852 | 8/1949 | Bacon . |
| 3,234,639 | 2/1966 | Dietzsch . |
| 3,625,102 | 12/1971 | Shino . |
| 3,655,475 | 4/1972 | Stelling, Jr. et al. ................... 156/197 |
| 3,655,476 | 4/1972 | Siegal ..................... 246/197 |
| 3,664,906 | 5/1972 | Hartig . |
| 3,773,584 | 11/1973 | Dietzsch et al. . |
| 3,792,562 | 2/1974 | Gilliliam . |
| 3,812,230 | 5/1974 | Takahashi . |
| 3,877,690 | 4/1975 | Owens . |
| 3,912,573 | 10/1975 | Kunz . |
| 4,155,800 | 5/1979 | Wilson . |
| 4,276,249 | 6/1981 | Holladay . |
| 4,351,680 | 9/1982 | Kohn . |
| 4,373,895 | 2/1983 | Yamamoto et al. ....................... 29/558 |
| 4,541,164 | 9/1985 | Monzon Indave ........................ 29/430 |
| 4,588,543 | 5/1986 | Huebner . |
| 4,606,960 | 8/1986 | Angel et al. . |
| 4,749,032 | 6/1988 | Rosman et al. ..................... 29/890.039 |
| 4,755,408 | 7/1988 | Noel . |
| 4,782,570 | 11/1988 | Spridco ..................................... 29/430 |
| 5,032,208 | 7/1991 | Strauss . |
| 5,152,060 | 10/1992 | Schubert et al. ................... 29/890.039 |
| 5,240,540 | 8/1993 | Matsumoto et al. . |
| 5,251,420 | 10/1993 | Johnson ................... 52/664 |
| 5,630,897 | 5/1997 | Branca et al. ........................ 156/292 |
| 5,658,644 | 8/1997 | Ho et al. . |
| 5,674,593 | 10/1997 | Earl ........................................ 156/292 |
| 5,683,782 | 11/1997 | Duchêne . |
| 5,792,295 | 8/1998 | Huebner et al. ....................... 156/292 |
| 5,849,393 | 12/1998 | Slattery ................................. 156/292 |
| 5,851,636 | 12/1998 | Lang et al. ............................ 156/292 |

FOREIGN PATENT DOCUMENTS

| | | |
|---|---|---|
| 670.027 | 9/1965 | Belgium . |
| 0550078 | 7/1993 | European Pat. Off. . |
| 1.310.591 | 10/1961 | France . |
| 1 209 725 | 1/1966 | Germany . |
| 2 129813 | 12/1971 | Germany . |
| 28 36 031 | 2/1980 | Germany . |
| 3815297 | 11/1989 | Germany . |
| 037956 | 8/1987 | Japan . |
| 435 693 | 11/1967 | Switzerland . |
| 435693 | 11/1967 | Switzerland . |
| 628467 | 8/1942 | United Kingdom . |
| 891110 | 3/1962 | United Kingdom . |
| 2 059 802 | 4/1981 | United Kingdom . |

*Primary Examiner*—Irene Cuda
*Assistant Examiner*—Trinh Nguyen
*Attorney, Agent, or Firm*—Jenkens & Gilchrist, P.C.

[57] ABSTRACT

Core-type structures are formed in a continuous process by assembling cut tubes or sheets of a thermoplastic material that are aligned, cut into separate continuous structures which are then subsequently cut into separate structures suitable for use as a core member.

8 Claims, 3 Drawing Sheets

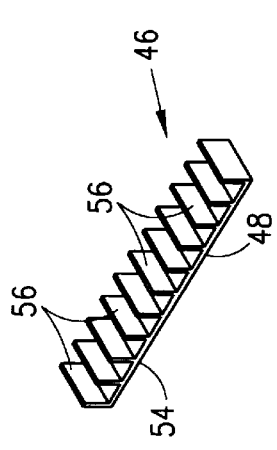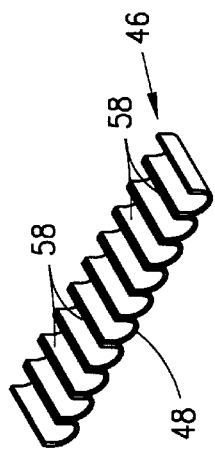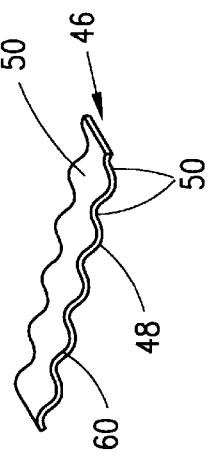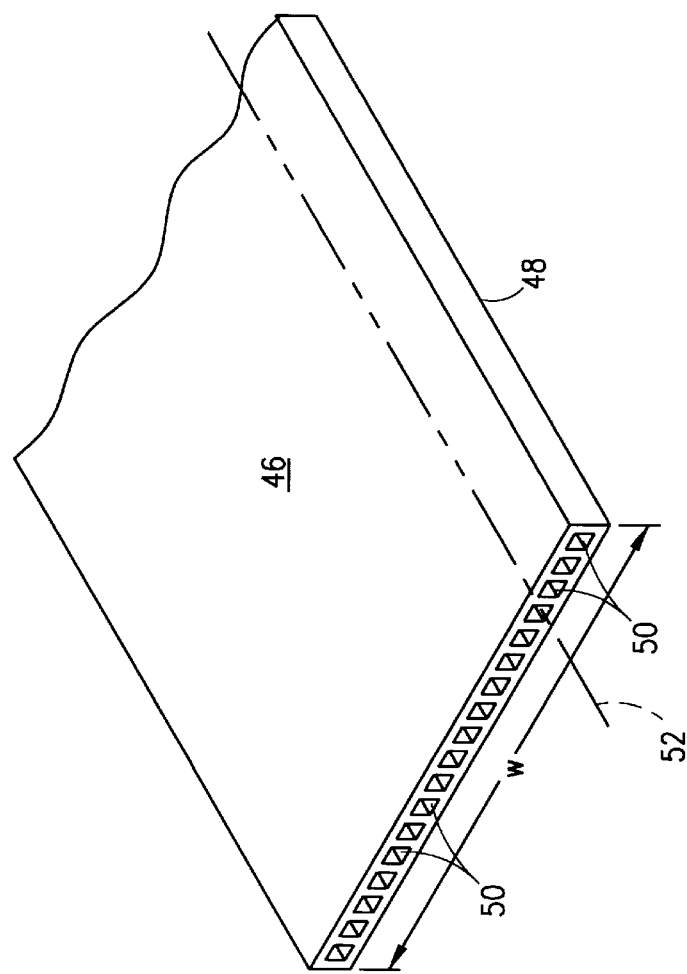

CONTINUOUS PROCESS FOR FORMING STRUCTURE SUITABLE FOR USE AS A CORE MEMBER

BACKGROUND OF THE INVENTION

1. Technical Field

This invention relates generally to a method for forming a structure suitable for use as a core member, either by itself or as part of a multi-ply panel, and more particularly to a continuous method for forming such a structure having a plurality of elongated passageways disposed parallel to the thickness of the structure.

2. History of Related Art

Many structural arrangements have been proposed for use as a core member in laminated assemblies such as multi-ply panels having a surface ply bonded to at least one side of the core member. In particular, core structures formed of short elongated tubular segments arranged in parallel to the thickness of the core member have been found to provide exceptional resistance to compressive deformation and crush damage. However, because such structures comprise very large numbers of separate tubes or similar cell components, they have heretofore been difficult to assemble and manufacture economically. For example, U.S. Pat. No. 5,032,208, issued Jul. 16, 1991 to Horst Strauss describes a process for manufacturing a bundle of tubes by loading the tubes into a gutter having a moveable end wall. The end wall is then moved incrementally to expose one end of the tubes, which are then cut and the cut ends fused whereby adjacent disposed tube ends are joined together. The bundle is then moved to a position whereat a second cut can be made, then moved to a position at which a third cut can be made, and continued, seriatim, until the entire bundle has been cut into the desired number of cores. The Strauss process is not only cumbersome, allowing only one transverse cut and fusing operation at a time, but also is dependent upon precise, controlled movement of one end of the gutter while maintaining a desired alignment of the uncut tubes in the bundle.

In an earlier arrangement, a structural core panel construction is described in U.S. Pat. No. 2,477,852, issued Aug. 2, 1949 to C. E. Bacon, in which short tubular members are adhesively joined along their entire length. Alternatively, other shapes, such as corrugated strips may be precisely aligned and adhesively joined together along mating corrugations and then transversely cut to provide a core. In all of the arrangements taught in the Bacon structure, the individual components are adhesively joined along their entire length. This process is also cumbersome and time consuming, requiring that the adhesive be set before moving the structure for subsequent processing, such as applying a cover to the core member.

Recently, U.S. patent application Ser. No. 5,683,782 issued Nov. 4, 1997 to Rainer Duchene describes a process for producing a honeycomb structure in which the individual components of the structure are coated with a heat-activated adhesive prior to assembly. After assembly, the adhesive is activated by a thermal treatment in which the individual components are bonded along their entire length. Thus, the Duchene process requires a precoating step prior to assembly and a separate thermal treatment prior to subsequent processing.

The present invention is directed to overcoming the problems set forth above. It is desirable to have a continuous method for forming a structure suitable for use as a core, instead of the above-described batch manufacturing processes. It is also desirable to have a method for forming a structure suitable for use in which a plurality of cores may be formed by simultaneous multiple cuts of a pre-assembled stack, or bundle, of components having internal passageways. It is also desirable to have such a structure that does not require adhesive joining of the separate components prior to forming into a core member. Furthermore, it is desirable to have a method by which a structure suitable for use as a core member can be formed without requiring a fixture having a moveable end wall by which only a single core member is formed before requiring movement of the assembled tubes to a subsequent position at which another core may be formed. Moreover, it is desirable to have a method for forming a plurality of cores simultaneously by which only selected open ends of the elongated members forming the core are fused together.

SUMMARY OF THE INVENTION

In accordance with one aspect of the present invention, a continuous method for forming a structure suitable for use as a core member includes extruding a thermoplastic material into a tubular structure, cutting the tubular structure into separate segments, each of which have a preselected length and a longitudinal axis extending along the preselected length, and aligning a plurality of the separate segments in side-by-side abutting relationship to form an assemblage of separate segments. The assemblage of separate segments is moved toward a first cutting station at which the assemblage of aligned segments is transversely cut at preselected spaced-apart locations along the longitudinal axes of the segments thereby forming a plurality of structures having a continuous length, a width substantially equal to the preselected width of the assemblage, and a thickness substantially equal to the distance between the spaced-apart locations of the transverse cuts. At least one of the cut ends of the transversely cut segments of the structure is simultaneously fused with the cut end of an adjacently disposed segment. The structures having a continuous length are continuously moved to a second cutting station whereat the continuous lengths are cut across the width of the structure at preselected intervals along the continuous length and separated into separate structures, each having a defined length.

Other features of the present invention include aligning the a plurality of the separate segments in side-by-side abutting relationship by moving the separate segments along a guideway having sidewalls that converge to a spaced-apart distance substantially equal to the preselected length of the segments. Still other features include the aligning of a plurality of separate segments in side-by-side abutting relationship by moving the separate segments into a vertically disposed hopper having an open end at the top to receive the second segments, a central portion having sidewalls that converge to a spaced-apart distance substantially equal to the preselected length of the segments, and a bottom disposed adjacent the first cutting station.

Other features of the continuous method for forming a structure include the tubular structure having a defined cross section, including a hollow circular cross section, a hollow rectangular cross section, a hollow triangular cross section, or a hollow hexagonal cross section. Additionally, the tubular structure may have at least one transversely disposed internal wall that divides the interior of the tubular structure into separate elongated hollow cells extending along the length of the tubular structure.

In accordance with another aspect of the present invention, a continuous method for forming a structure suitable for use as a core member includes extruding a continuous thermoplastic sheet having a predefined width, at least one surface extending across the width, and a plurality of elongated passageways disposed in parallel relationship with the at least one surface and with each other. Each of the elongated passageways has a longitudinal axis perpendicular to the direction of width of the thermoplastic sheet. The continuous thermoplastic sheet is cut across its width to form a plurality of separate plates, each having a preselected length extending in a direction parallel to the longitudinal axes of the elongated passageways. The separate plates are then assembled, one on top of another, to form a continuous stack of the plates in which the elongated passageways in each plate are arranged in a common parallel direction. The respective cut ends of the separate plates are aligned in a common plane transverse to the longitudinal axes of the segment. The continuous stack of separate plates is then continuously moved toward a first cutting station whereat the continuous stack of aligned plates is transversely cut at preselected spaced-apart locations along the longitudinal axes of the passageways of the plates. The transverse cutting of the continuous stack forms a plurality of separate structures each having a continuous length, a width substantially equal to the preselected width of the assemblage, and a thickness substantially equal to the distance between the spaced-apart locations of the transverse cuts. Simultaneously with the transverse cutting operation, at least one of the cut surfaces of a respective cut plate is fused with the cut surface of an adjacently disposed cut plate. The continuous length structures are then continuously moved to a second cutting station whereat cuts are made across the width of each of the continuous length structures and the continuous length structures are divided into separate structures having a defined length.

Other features of the continuous method for forming a structure, as set forth above, include the elongated passageways being at least partially formed by a base wall having a first side defined by the surface extending across the width of the thermoplastic sheet, and a plurality of spaced-apart parallel walls extending from a second side of the base wall in a direction normal to the base wall. Alternatively, elongated passageways may be defined by a plurality of adjacently disposed U-shaped channels wherein the bottoms of the U-shaped channels define the surface extending across the width of the thermoplastic sheet. Also, the surface extending across the width of the thermoplastic sheet may be defined by one side of a serpentine wall and the elongated passageways defined by alternating convex and concave curved portions disposed on respective sides of the serpentine wall.

BRIEF DESCRIPTION OF THE DRAWINGS

A more complete understanding of the structure and operation of the present invention may be had by reference to the following detailed description when taken in conjunction with accompanying drawings:

FIG. 9 is a three-dimensional view of a thermoplastic sheet structure used in one embodiment of the method of forming a structure suitable for use as a core member, in accordance with the present invention;

FIG. 10 is a three-dimensional view of another arrangement of a sheet structure suitable for use in carrying out the method embodying the present invention;

FIG. 11 is a three-dimensional view of another arrangement of a sheet structure suitable for use in carrying out the method embodying the present invention; and FIG. 12 is a three-dimensional view of another embodiment of a thermoplastic sheet structure suitable for use in a method of forming a structure in accordance the present invention.

DETAILED DESCRIPTION OF PRESENTLY PREFERRED EXEMPLARY EMBODIMENTS

Figure 1:
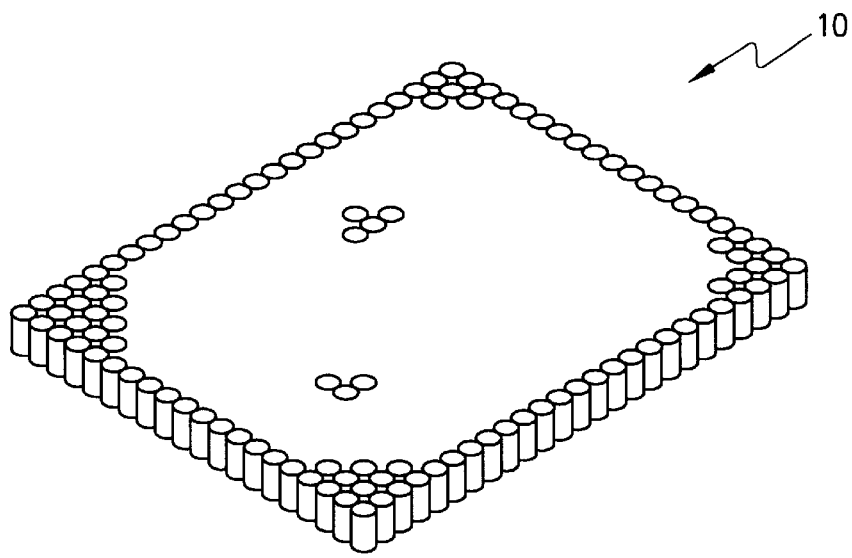
FIG. 1 is a three-dimensional view of a structure suitable for use as a core member, made in accordance with the method embodying the present invention.

The present invention is described by reference to various embodiments of a method for continuously forming a structure 10, as shown in FIG. 1, suitable for use as a core member, e.g., such as the cores used in multi-ply panels, various laminated panel constructions, or as stand-alone structural members. Such cores and panels are used in many fields, such as transportation, housing, marine, architectural, and other fields. The structure 10 is typically used as a core over which a planar panel is applied to one, or usually both, sides of the structure 10. The planar panels may be plywood, aluminum or other metal, plastic, fiberglass, fabric such as found in wall coverings and carpeting, or other material.

Figure 2:
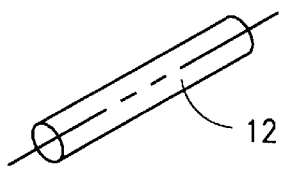
FIG. 2 is a three-dimensional view of an elongated tubular shape having a hollow circular cross-section.
Figure 3:
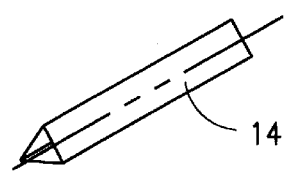
FIG. 3 is a three-dimensional view of an elongated tubular shape having a hollow triangular cross-section.
Figure 4:
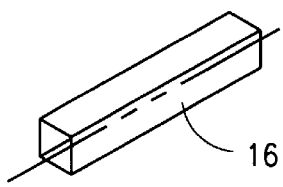
FIG. 4 is a three-dimensional view of an elongated tubular shape having a hollow square cross-section.
Figure 5:
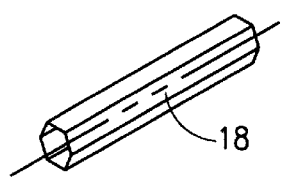
FIG. 5 is a three-dimensional view of an elongated tubular shape having a hollow hexagonal cross-section.
Figure 6:
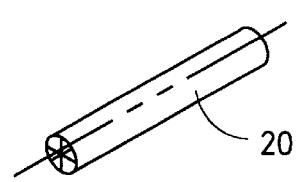
FIG. 6 is a three-dimensional view of an elongated tubular shape having a plurality of transversely disposed internal walls which form a plurality of separate elongated hollow cells extending along the length of the elongated tubular member.

As shown in FIGS. 2–6, in one arrangement of the structure 10, short sections of an elongated tubular shape are arranged normal to the broad surfaces of the panel and, due to their short columnar length, advantageously exhibit high strength along the longitudinal axes of the short columns. Although a circular shape 12, as shown in FIG. 2, is used in the following description of the preferred exemplary embodiments of the method for forming a structure 10, other shapes such as a tubular member 14 having a hollow triangular cross section as shown in FIG. 3, a tubular member 16 having a hollow square cross section, as shown in FIG. 4, a tubular member 18 having a hexagonal cross section, as shown in FIG. 5, or a tubular member 20 having one or more transversely disposed internal walls which form a plurality of separate elongated hollow cells extending along the length of the tubular member 20, as shown in FIG. 6. Moreover, the tubular member may have a non-uniform cross section, i.e., the cross-sectional area may vary along its length to form tapered segments. In carrying out the method embodying the present invention, it is particularly desirable that the elongated tubular members be formed of a thermoplastic material such as polyethylene, polypropylene, polyvinyl chloride, or other thermoplastic material suitable for high forming rate extrusion processing.

Figure 7:
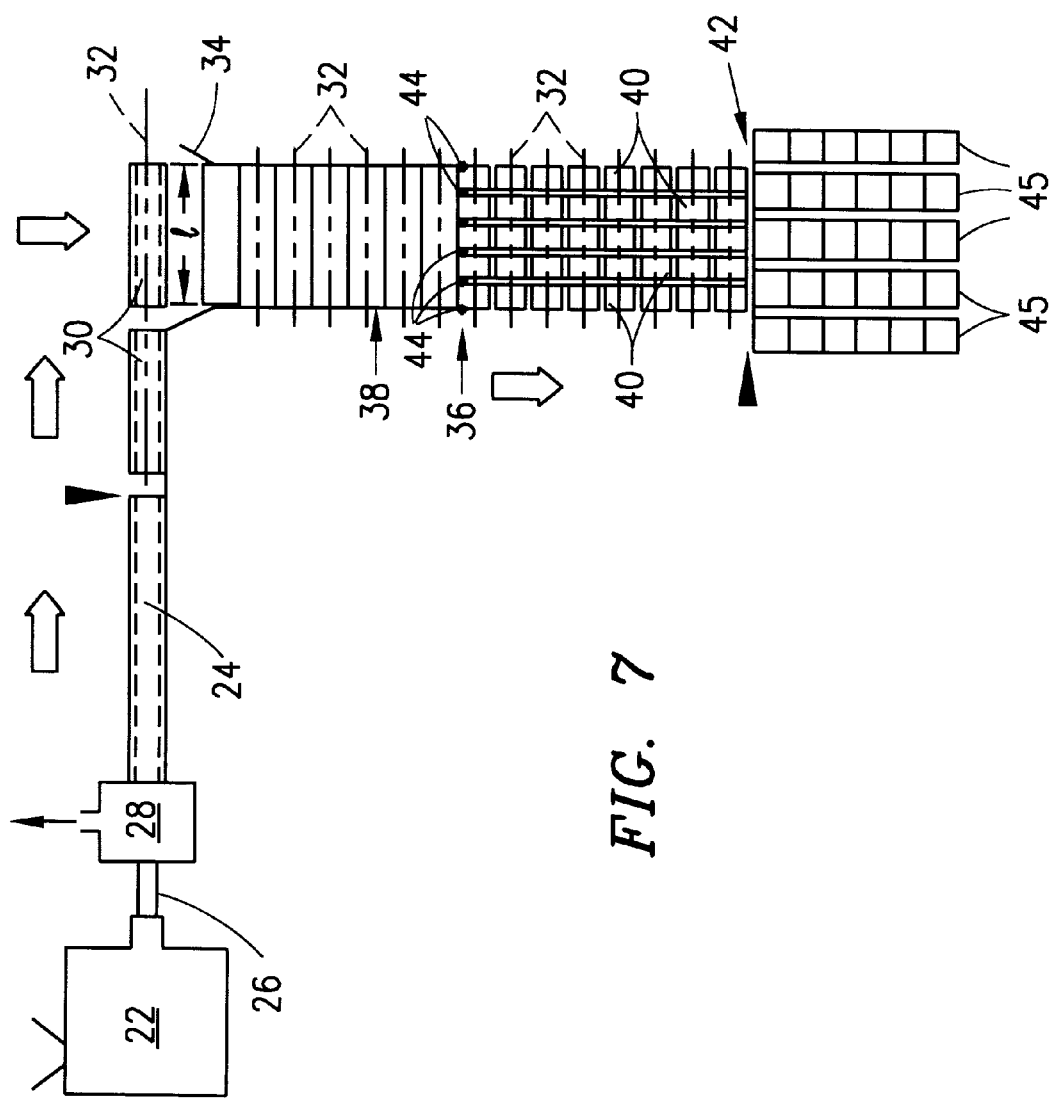
FIG. 7 is a schematic diagram showing the operational flow of a continuous method for forming a structure suitable for use as a core member, in accordance with the present invention.

In a first exemplary preferred embodiment of a method, in accordance with the present invention, of forming a structure 10, a thermoplastic material is discharged from an extruder 22 as an elongated tubular shape 24 as shown schematically in FIG. 7. The tubular shape 24 is illustrated and used herein in a generic sense and may encompass any one or more tubular shapes such as the aforementioned cross sections, or other variations and alterations of such cross sections. In shapes having hollow cross sections, it is highly desirable to extrude the thermoplastic material as a solid rod 26 and then shape the exterior wall of the tubular shape 24 by expanding the solid rod 26 in a vacuum sizer 28 which simultaneously forms a hollow void in the center of the extruded shape 24. The extruded shape 24, either with or without vacuum sizing is allowed to cool, or actively cooled, to a temperature at which it is self supporting and can be readily cut into separate segments 30, each having a preselected length 1 and a longitudinal axis 32 extending along the preselected length of the segments 30. The cutting operation may advantageously be accomplished by a blade which rotates at a speed coordinated with the extrusion rate of the tubular member 24 so that each segment 30 has substantially the same length 1, end-to-end.

Figure 8:
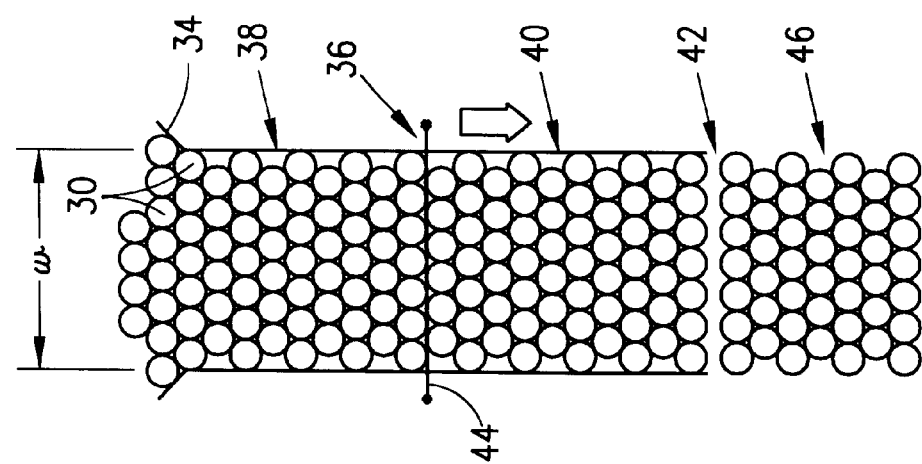
FIG. 8 is a side view of a portion of the schematic diagram of FIG. 7.

The cut segments 30 are then generally aligned in side-by-side abutting relationship by depositing the separate segments 30 into a vertically disposed hopper 34 having an open upper end to receive the separate segments 30, a central portion having side walls that converge to a spaced-apart distance substantially equal to the preselected length 1 of the segments 30, and an end opposite to the open end that is positioned adjacent a first cutting station 36. Aligning of the separate segments within the hopper 34 forms the separate segments into an assemblage 38 having a preselected width w, as shown in FIG. 8, with the respective cut ends of the separate segments aligned in a common plane transverse to the longitudinal axes 32 of the segments 30. The assemblage 38 is continuously moved, by the aid of gravity or other means, toward a first cutting station 36. At the first cutting station 36, a plurality of heated wires 44 transversely cut the assemblage 38 at preselected spaced-apart locations along the longitudinal axes 32 of the segments 30 and forms a plurality of structures 40 having a continuous length, a width substantially equal to the preselected width of the assemblage 38, and a thickness substantially equal to the distance between the spaced-apart locations of the transverse cuts. Simultaneously, at least one of the ends of the respective transversely cut segments is fused with an adjacent cut segment end in the structure 40. If desired, the outer ends of each of the elongated segments 30 may be cut to assure that the outer continuous structures 40 have a uniform thickness.

Alternatively, although the use of hot wires 44 is the presently preferred way of cutting the assemblage 38 into continuous length structures, other thermal cutting methods may also be used, such as laser, a heated blade, a saw blade which is able to provide sufficient friction to both cut and fuse the cut ends of the segments 30, or other methods.

The heat produced by the hot wires 44, or other apparatus as described above, should be such that it is not only sufficient to cut, i.e., sever the segments 30 contained within the assemblage 38, but also provide sufficient heat to at least partially melt the cut ends of the segment 30 and fuse adjacent cut segments to each other. If it is desired to later use the structure 10 in a panel assembly that has curved surfaces, or for other uses in which a curved core is desired, one cut surface of the continuous structure 10 should be fused and the opposite cut surface of the continuous structure 10 not fused, i.e., the open ends of the segments 30 not joined together. This can be easily accomplished using the continuous method embodying the present invention. For example, during the cutting operation illustrated at the first cutting station 36, the temperature of the hot wires 44 can be controlled so that one set of wires 44 has a temperature sufficient to cut and fuse the cut ends of the segments 30, whereas an alternating set of the hot wires 44 has a temperature sufficient to only cut the segments 30 without fusing the cut ends. By way of further example, the first hot wire 44 positioned at the left end of the first cutting station 36 may be controlled to have a temperature sufficient to not only cut the ends of the segments 30 but also to fuse the cut ends, whereas the second wire 44 from the left end may be controlled to a temperature sufficient to only cut the segments 30. In like manner, the third wire 44 from the left end may be controlled to a temperature sufficient to cut and fuse the segments 30. Thus, the two left-hand continuous structures 40 each have one surface at which the cut segments are fused, and an opposite surface at which the cut segments are not fused together. This permits the continuous structure 40 to be bent to a shape in which the uncut surface can be curved into a convex curve, and a corresponding fused surface curved into a concave shaped surface.

The separate continuous structures 40 are then continuously moved, by the aid of gravity, mechanical or other means, to a second cutting station 42 whereat a cut is made across the width of the continuous structures 40 at preselected intervals along the continuous length of the structures 40. This final cutting operation separates the continuous length structures 40 into separate structures 45, each having a defined length.

Alternatively, in accordance with the present invention, the continuous method for forming a structure suitable for use as a core member may be carried out by extruding a continuous thermoplastic sheet 46 having a construction as illustrated in FIGS. 9–12. In the alternative embodiment, the thermoplastic sheet 46 has at least one surface 48 that extends across the width w of the thermoplastic sheet 46, and a plurality of elongated passageways 50 that are disposed in parallel relationship with the surface 48 and with each other. Each of the elongated passageways 50 have a longitudinal axis 52 that is perpendicular to the direction of the width of the sheet 46. As illustrated in FIG. 9, in one arrangement the longitudinal passageways 50 have a hollow rectangular cross section. Other shapes of hollow cross sections may be formed between the pair of planar surfaces of the sheet 46 and include hollow circular cross sections, hollow triangular cross sections, hollow hexagonal cross sections, or other arrangements described above with respect to the extruded elongated tubular shapes 24.

In the structure shown in FIG. 10, the elongated passageways are at least partially formed by a base wall 54 having a first side which defines a surface 48 extending across the bottom of the thermoplastic sheet 46. The longitudinal passageways are further defined by a plurality of spaced-apart parallel walls 56 that extend from a second side of the base wall 54 in a direction normal to the base wall 54. The upper open portion of the passageways in the FIG. 9 arrangement are covered when a second sheet is assembled on top of the first sheet, thereby completing an enclosure around the elongated passageway. Another arrangement of the thermoplastic sheet 46, illustrated in FIG. 11, has a series of adjacently disposed U-shaped channels 58, wherein the bottom of the U-shaped channels 58 define the surface 48 extending across the bottom of the sheet. In FIG. 12, the thermoplastic sheet is defined by a serpentine wall 60 extending across the width of the sheet 46. Each side of the serpentine wall 60 defines surfaces that are alternatingly convex and concave curved, and thereby define elongated passages in the respective curved portions.

In the alternative embodiment, the thermoplastic sheet 46 is cut across its width whereby a plurality of separate plates are formed, in similar fashion to the segments in the above-described process using extruded tube segments. Each of the plates have a preselected length 1 in a direction parallel to the longitudinal axis of the elongated passageways 50 extending through the thermoplastic sheet 46. The separate plates are assembled in a similar manner as described above with respect to the segments 30 to form a continuous stack of the plates in which the elongated passageways 50 in each plate is arranged in a common parallel direction. The respective cut ends of the plates are generally aligned, for example, in a hopper 34 in a common plane transverse to the longitudinal axes 52 of the plates. The continuous stack of separate plates is then continuously moved toward the first cutting station 36 whereat the continuous stack of aligned plates is separated into separate structures 40, each having a continuous length, a width substantially equal to the preselected width of the stacked plates, and a thickness substantially equal to the distance between the spaced-apart locations of the transverse cuts. Also, as described above, the cut ends of adjacently disposed transversely cut plates may be simultaneously fused.

Lastly, the separated continuous structures 40 are continuously moved to the second cutting station 42 whereat the continuous structures 40 are cut across their respective widths at preselected intervals along the length of each of the structures 40 and separated into separate structures 44 having a defined length.

Thus, it can be seen that by the methods described above, a structure suitable for use as a core member can be easily formed by a continuous process and in an efficient and economical manner. The continuous method described herein does not require adhesive joining or the use of intermediate fixtures to hold a plurality of thermoplastic tubes or plates during transfer from one operation to another. Each handling and transfer of segments or plates during multiple single step operations may lead to misalignment of the plates or segments between successive cuts.

Although the present invention is described in terms of preferred exemplary embodiments, with specific illustrative shapes of tubular members and thermoplastic sheet structures, those skilled in the art will recognize that changes in those shapes, arrangements, and materials may be made without departing from the spirit of the invention. Such changes are intended to fall within the scope of the following claims. Other aspects, features and advantages of the present invention may be obtained from a study of this disclosure and the drawings, along with the appended claims.

We claim:

1. A continuous method for forming a structure suitable for use as a core member; comprising:

cutting a thermoplastic tubular member into a plurality of separate segments, each of said separate segments having a preselected length defined by spaced apart ends, and a longitudinal axis extending along said preselected length;

aligning said plurality of said separate segments in side-by-side abutting relationship to form an assemblage of aligned separate segments, said assemblage having a preselected width and each of the spaced apart ends of the separate segments generally aligned in a respective common plane transverse to the longitudinal axes of the separate segments;

continuously moving said assemblage of aligned separate segments in a direction perpendicular to the longitudinal axes of the separate segments toward a first cutting station;

transversely cutting said continuously moving assemblage of aligned separate segments at preselected spaced apart locations along the longitudinal axes of the separate segments thereby forming a plurality of transversely cut segments having spaced apart cut ends, and simultaneously fusing at least one of the cut ends of the transversely cut segments with the cut end of an adjacently disposed cut segment thereby forming a plurality of structures each having a continuous length, a width substantially equal to the preselected width of said assemblage, and a thickness substantially equal to the distance between said spaced apart locations;

continuously moving said structures having a continuous length to second cutting station; and cutting across the width of each of said continuous length structures at preselected intervals along the continuous length of each of the structures and separating said continuous length structures into separate structures each having a defined length.

2. A continuous method of forming a structure, as set forth in claim 1, wherein prior to said cutting a thermoplastic tubular member into a plurality of separate segments, said method includes extruding a thermoplastic material into an elongated tubular member.

3. A continuous method of forming a structure, as set forth in claim 2, wherein said extruding a thermoplastic material into an elongated tubular member includes extruding an elongated tubular member having a hollow circular cross section.

4. A continuous method for forming a structure, as set forth in claim 2, wherein said extruding a thermoplastic material into an elongated tubular member includes extruding an elongated tubular member having a hollow rectangular cross section.

5. A continuous method for forming a structure, as set forth in claim 2, wherein said extruding a thermoplastic material into an elongated tubular member includes extruding an elongated tubular structure having a hollow triangular cross section.

6. A continuous method for forming a structure, as set forth in claim 2, wherein said extruding a thermoplastic material into an elongated tubular member includes extruding an elongated tubular structure having a hollow hexagonal cross section.

7. A continuous method for forming a structure, as set forth in claim 2, wherein said extruding a thermoplastic material into an elongated tubular member includes extruding a tubular member having at least one transversely disposed internal wall forming a plurality of separate elongated hollow cells extending along the length of said tubular member.

8. A continuous method for forming a structure, as set forth in claim 1, wherein said aligning a plurality of said separate segments in side-by-side abutting relationship includes moving said separate segments into a hopper having an open end to receive said separate segments, a central portion having side walls that converge to a spaced apart distance substantially equal to the preselected length of said segments, and an end disposed opposite said open end and positioned adjacent said first cutting station.

\* \* \* \* \*